June 9, 1959     E. SAUER ET AL     2,889,740
PHOTOELECTRIC EXPOSURE METERS

Filed March 5, 1957     3 Sheets-Sheet 1

Inventors:
Edgar Sauer
Erich Aschbacher
by Singer, Stern & Carlberg,
Attorneys.

June 9, 1959  E. SAUER ET AL  2,889,740
PHOTOELECTRIC EXPOSURE METERS
Filed March 5, 1957  3 Sheets-Sheet 2

Inventors:
Edgar Sauer
Erich Aschbacher
by Singer, Stern & Carlberg,
Attorneys.

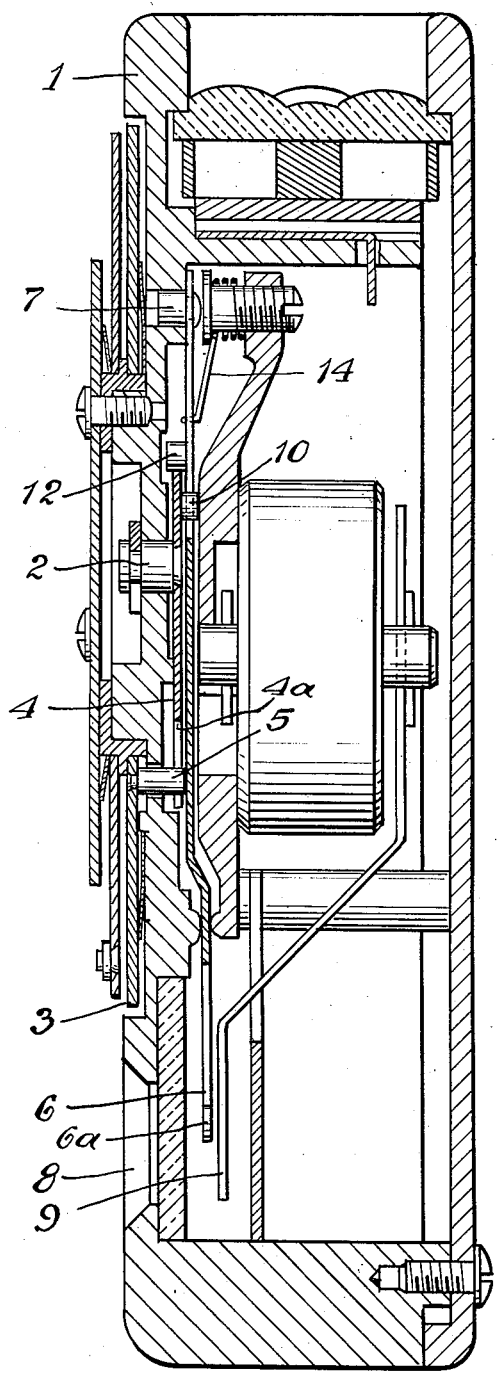

United States Patent Office 2,889,740
Patented June 9, 1959

2,889,740

PHOTOELECTRIC EXPOSURE METERS

Edgar Sauer and Erich Aschbacher, Stuttgart, Germany, assignors to Zeiss Ikon A.G. Stuttgart, Stuttgart, Germany Application March 5, 1957, Serial No. 644,061

Claims priority, application Germany March 10, 1956

4 Claims. (Cl. 88—23)

The invention relates to photoelectric exposure meters and particularly to photoelectric exposure meters provided with a cam controlled follow-up pointer.

In photoelectric exposure meters of this type the electrical measuring instrument is provided with a pointer moving over a scale while the cam-controlled follow-up pointer is actuated by a calculating device provided with a manually adjustable shutter speed or diaphragm adjusting ring which when adjusted moves the follow-up pointer by means of a cam-drive interposed between said ring and said follow-up pointer. The shutter speed or diaphragm ring is provided in customary manner with a graduation having a linear division, while the deflections of the electrical measuring instrument follow a non-linear regularity. The cam drive interposed between the mentioned calculating device and the follow-up pointer is constructed in such a manner so as to effect a compensation between the two different scales on the ring of the calculating device and of the measuring instrument, respectively, to permit a very accurate reading of the exposure meter. Basically the cam drive is provided with a cam having a control curve or a curved control edge. This cam is moved when the calculating device is adjusted to actuate the follow-up pointer which is coupled with said cam by a feeler or cam follower urged in engagement with said control curve.

The invention has as one of its objects to provide a very compact construction of the exposure meter and also a very accurate reading of the same. The constructional features of such an exposure meter are such that a rather extensive adjustment range has to be provided within a very limited space. This is only possible by employing a very sharply curved and a very long extending control curve which, however, in certain portions of the adjustment range will have a very unfavorable engagement with the feeler or cam follower, particularly at the start and at the end of the adjustment range, or else the deflection indications or scale lines of the instrument pointer would be squeezed successively closer together from stage to stage. The effective lever arm of the feeler and the control curve meet under a substantial deviation from a favorable right angle. In fact, they meet under obtuse or also acute angular conditions in so-called stretched or broken positions so that even very small measuring deviations result in great control deflections. Extremely stretched positions may also lead to wedging effects between cam and cam follower and the accuracy of the indication of the exposure meter would be very poor and the wear on the engaging parts would be very substantial.

The invention overcomes all of these disadvantages in that at least two or more cam drives are employed for the control of the follow-up pointer over its entire range of adjustment and the cam drives come into operation one after the other. In most cases only two serially arranged cam drives are required, provided a suitable selection of the lever proportions and of the engagement points of the feelers on the curved edges of the cams are selected, so that even when short curved edges are used the follow-up pointer is adjusted along the entire adjustment range very easily and extremely accurately.

A further object of the invention is to make at least one cam integral with the follow-up pointer because in that particular case the control curves are formed in simple manner by the outer edges of a cam plate and no curved slots are required.

The general features of one form of this invention will be more fully explained in connection with the accompanying drawings in which:

Fig. 5 is a sectional view along the line 5—5 of Fig. 4.

Figure 2:
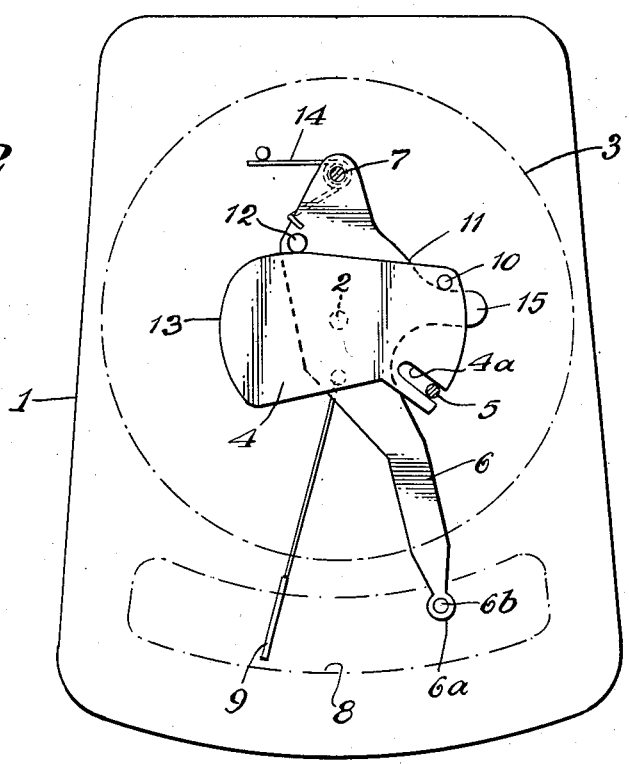
Fig. 2 is a similar view as shown in Fig. 1, and illustrates the parts in a position in which the first cam drive becomes inoperative and the second cam drive becomes operative.

Referring to the drawings, the graduated ring 3 of the calculating device is rotatably mounted on the outside of the casing 1 and is rotatable about the axis 2. A control disc 4 is also rotatably mounted about the axis 2 and is rotated by a pin 5 attached to the ring 3 when the latter is rotated. A follow-up pointer 6 is rotatable about an axis 7 which is arranged eccentrically with reference to the control disc 4. The free end of the pointer 6 terminates in a small circular portion 6a provided with an aperture 6b. This circular portion 6a is visible through an arc-shaped window 8 provided in the casing 1. This window 8 permits also an observation of the pointer 9 of the measuring instrument mounted in the casing 1.

Figure 3:
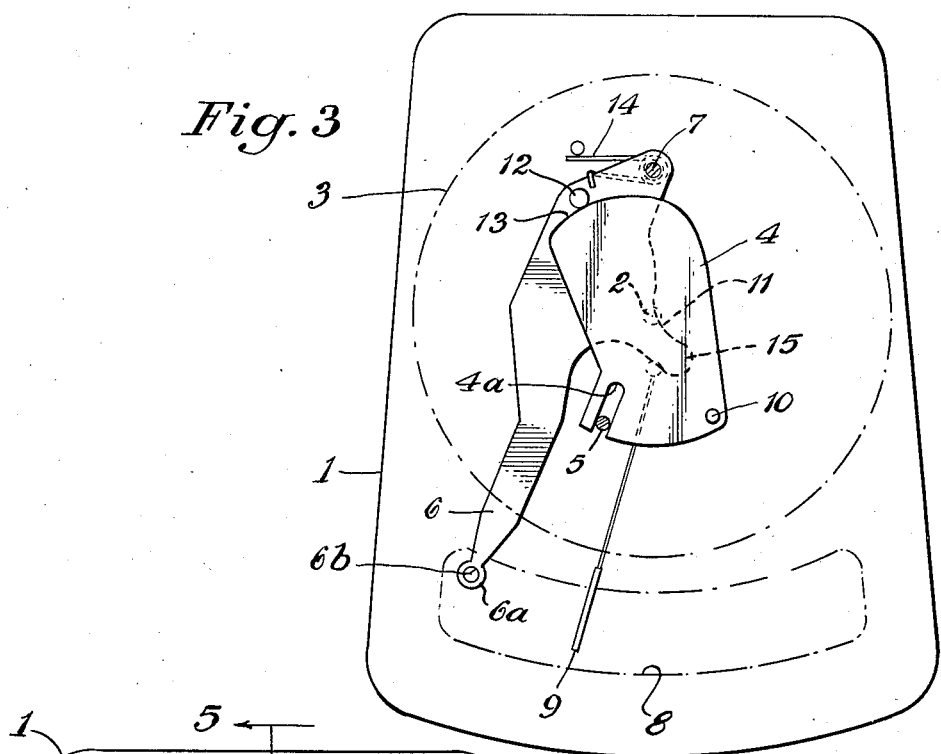
Fig. 3 is a similar view as shown in Fig. 1, but shows the parts in a position at the end position of the follow-up pointer in which it has been moved by the second cam drive.
Figure 4:
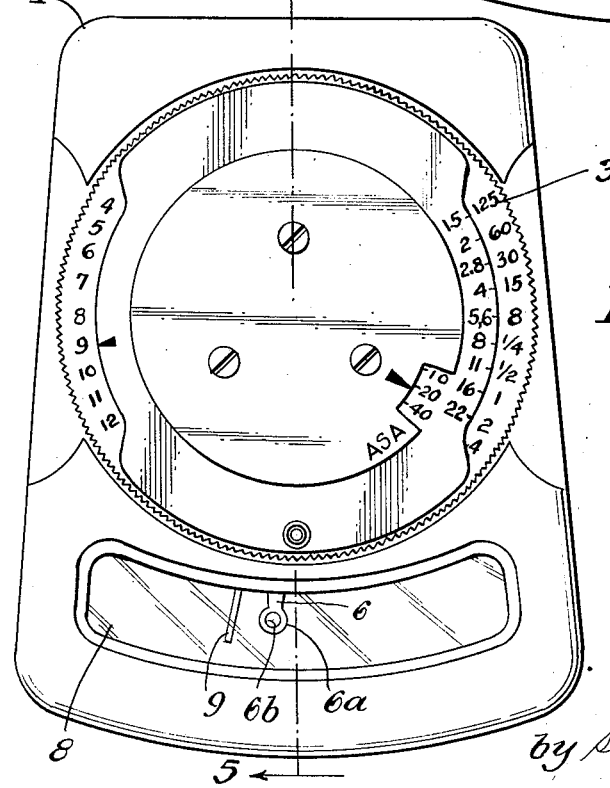
Fig. 4 is a top elevation view of the exposure meter showing the light value scale, the film speed scale, the shutter speed scale and the diaphragm scale.

The control disc 4 is operatively connected with the follow-up pointer 6 by two cam drives which come into action one after the other during the movement through the entire adjustment range. One cam drive consists of the pin 10 attached to the control disc 4 and the curved edge portion 11 on the follow-up pointer 6. The other cam drive is formed by a pin 12 attached to the follow-up pointer 6 and a curved edge portion 13 of the control disc 4. A spring 14 urges the follow-up pointer 6 continuously in engagement with the control disc 4 so that either the curved edge portion 11 rests against the pin 10 (Fig. 1) or the pin 12 rests against the curved edge portion 13 (Fig. 3).

The curved edge portions 11 and 13 are shaped in such a manner that the same, each for their part, convert the uniform rotative adjustments of the graduated ring 3 from one light value to the next one into non-uniform movements of the follow-up pointer 6 corresponding to the step by step different deflections of the pointer 9 of the measuring instrument.

Figure 1:
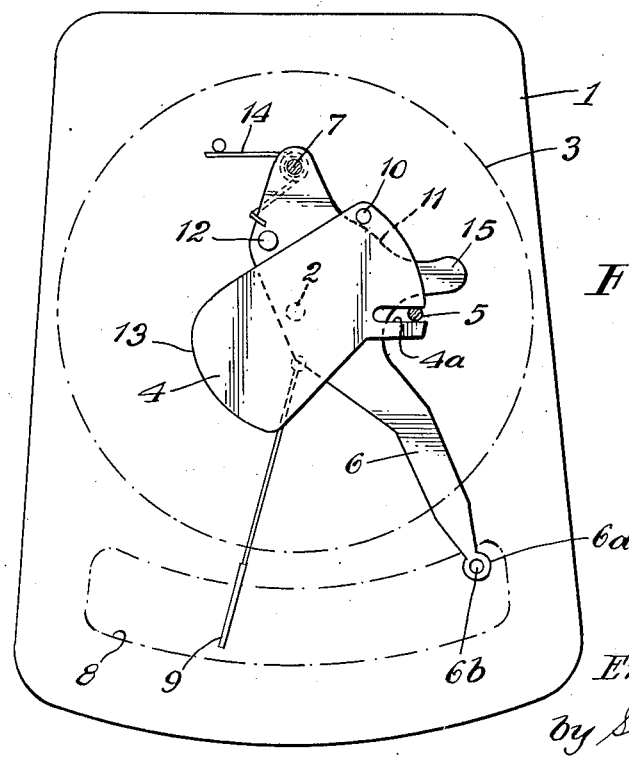
Fig. 1 is a diagrammatic top view of the photoelectric exposure meter indicating only the cam drive and the position of the parts in the zero position of the follow-up pointer.

In the end position (zero position) of the follow-up pointer 6, as shown in Fig. 1, the curved edge portion 11 of the pointer 6 engages the pin 10 on the control disc 4 and therefore the first-mentioned cam drive is in operation while the second mentioned cam drive is inoperative, because the pin 12 on the follow-up pointer 6 is spaced from the edge portion 13 of the control disc 4. When now the graduated ring 3 is rotated the pin 5 thereon which projects into a slot 4a of the control disc 4 will rotate the latter and the pin 10 will slide along the edge 11 of the follow-up pointer 6 and rotates the latter about its pivot axis 7 so that the follow-up pointer moves along a portion of the range along which the pointer 9 of the measuring instrument is movable, for instance, along a portion representing five light value stages. The parts described have now reached the position shown in Fig. 2, in which the pin 12 on the follow-up pointer 9 rests against the curved edge of the control disc 4 so that now the second mentioned cam drive becomes operative and controls the movement of the follow-up pointer 6 until the latter reaches the other end position shown in Fig. 3.

The selected arrangement assures in both said cam drives convenient dimensions and favorable control conditions, in that in each of the cam drives and the control range of the same the effective lever arms 7, 10 and 2; 10 or 7, 12 and 2, 12 respectively, of the drive members and the cam edges do always meet at right angles or at such angles which toward an obtuse or acute angle deviates very little from a right angle. If, on the other hand, however the cam drive 10, 11 would have been used alone for adjusting the follow-up pointer 6 along its entire range, the curved edge 11 would have to be provided with such a long extension 15 that there would be created acute angles of engagement with the pin 10 which would have serious disadvantages. In similar manner, employing the second cam drive 12, 13, alone, would result in unfavorable obtuse angles of engagement with the pin 12 in the range of the lower light value stages and would disadvantageously influence the accuracy of adjustment of the follow-up pointer 6.

What we claim is:

1. In a photoelectric exposure meter with a casing having mounted therein an electrical measuring instrument with a pointer movable over a scale, a follow-up pointer adapted to be adjusted to a position in registration with said first mentioned pointer, a manually adjustable member accessible from the outside of said casing, a cam follower driven by said member engageable with a cam surface on said follow-up pointer to move the same for a portion of its adjustment, and a cam follower on said follow-up pointer engageable with a cam surface driven by said adjustable member to move said follow-up pointer through its remaining range of adjustment, said cams and cam followers being angularly arranged such that the respective cams and cam followers become engaged one after the other to adjust said follow-up pointer when said manually adjustable member is adjusted through its entire range of adjustment.

2. In a photoelectric exposure meter a casing having mounted therein an electrical measuring instrument with a pointer movable over a scale, a follow-up pointer adapted to be adjusted to a position in registration with said first mentioned pointer, a manually rotatable annular member mounted on the outside of said casing, a cam rotatably mounted in said casing connected to said manually rotatable member, a pin on said cam adapted to drivingly engage a cam surface on said follow-up pointer, and a pin on said follow-up pointer adapted to be engaged by a cam surface on said cam, and means operatively connecting said annular member with said cams and cam followers, said cam drives being angularly arranged such that the respective cams and cam followers become engaged one after the other to adjust said follow-up pointer when said manually rotatable annular member is rotated.

3. In a photoelectric exposure meter with a casing having mounted therein an electrical measuring instrument with a pointer movable over a scale, a follow-up pointer adapted to be adjusted to a position in registration with said first mentioned pointer, a manually adjustable member accessible from the outside of said casing, and at least two cam drives between said adjustable member and said follow-up pointer, said cam drives include a control disc rotatable about an axis spaced from the axis about which said follow-up pointer is pivotally mounted, means for operatively connecting said manually adjustable member with said control disc to rotate the latter when said adjustable member is moved, a cam follower on said control disc adapted to engage a cam surface on said follow-up pointer to move said follow-up pointer through a portion of its range of adjustment during a first portion of the movement of said adjustable member, and a cam follower on said follow-up pointer adapted to engage a cam edge on said control disc to move said follow-up pointer through the remaining portion of its range of adjustment during a second portion of the movement of said adjustable member, said first and second portion of movement of said adjustable member being continuous to follow in sequence one after the other throughout the entire range of adjustment of said follow-up pointer.

4. In a photoelectric exposure meter, a casing having mounted therein an electrical measuring instrument with a pointer movable over a scale, a follow-up pointer provided with a cam edge, said follow-up pointer being adapted to be adjusted to a position in registration with said first mentioned pointer, a manually rotatable annular member mounted on the outside of said casing, at least two interconnected cam drives within said casing and disposed annularly between said member and said follow-up pointer, said cam drives include a control disc rotatable about an axis spaced from the axis about which said follow-up pointer is pivotally mounted, means for operatively connecting said manually rotatable annular member with said control disc to rotate the latter when said annular member is rotated, a cam follower on said control disc adapted to engage said cam edge on said follow-up pointer to move said follow-up pointer through the initial portion of its range of adjustment during a first portion of the movement of said annular member, and a cam follower on said follow-up pointer adapted to engage a cam edge on said control disc to move said follow-up pointer through the remainder of its range of adjustment during a second portion of the rotation of said annular member, said first and second portion of the rotation of said annular member are continuous and follow one after the other.

References Cited in the file of this patent

UNITED STATES PATENTS 2,437,774    Willcox    Mar. 16, 1948

FOREIGN PATENTS 458,546    Great Britain    Dec. 22, 1936